May 24, 1960 R. SMITH 2,938,061
ALKYLATION PROCESS
Filed Aug. 5, 1958 2 Sheets-Sheet 2
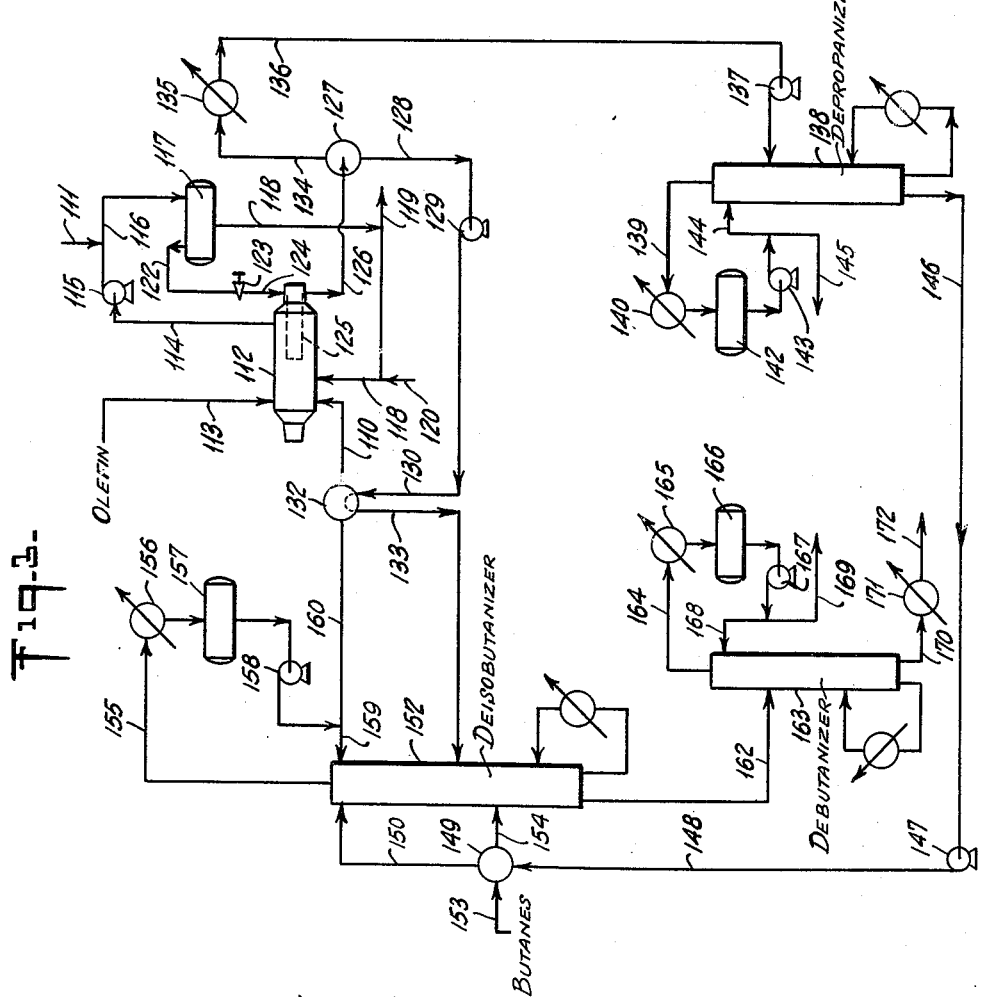
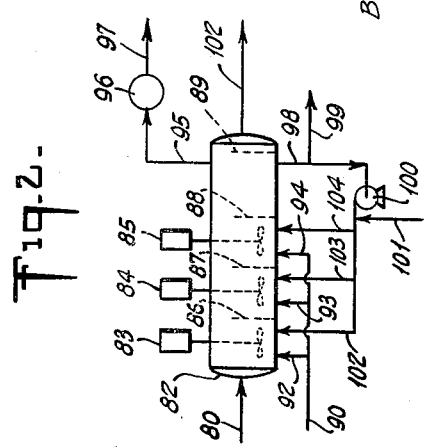

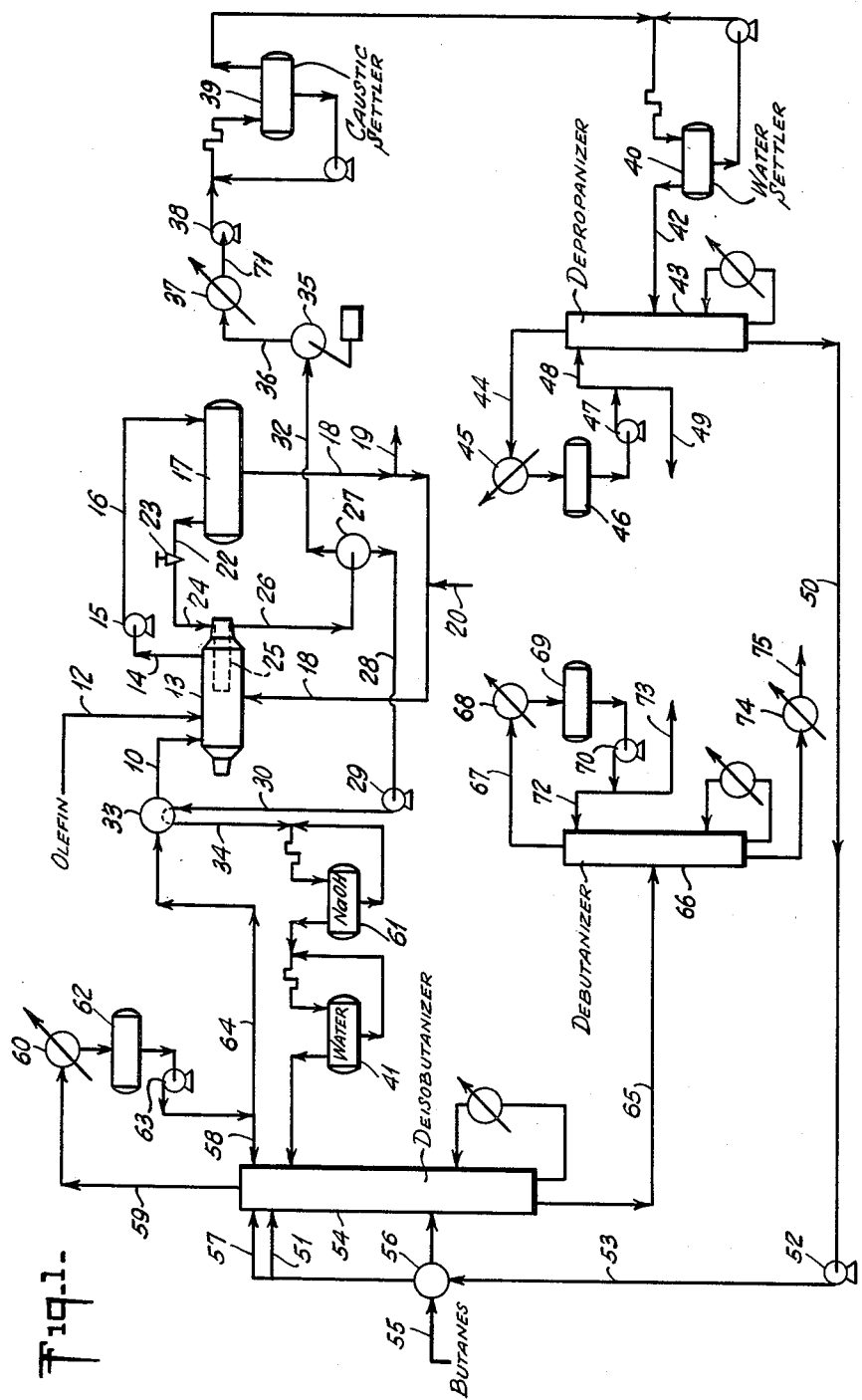

United States Patent Office 2,938,061
Patented May 24, 1960

2,938,061

ALKYLATION PROCESS

Randlow Smith, New Rochelle, N.Y., assignor to Texaco Inc., a corporation of Delaware Filed Aug. 5, 1958, Ser. No. 753,383

5 Claims. (Cl. 260—683.62)

This invention relates to an improved process for catalytic alkylation, and more specifically to such process wherein an olefin-based alkylatable material is alkylated with isobutane.

In an alkylation of this type a preponderance of isobutane (generally as much as 70 to 80 volume percent, or even more, of all the hydrocarbons in the reaction mixture) over alkylatable material and hydrocarbon diluents is used to direct the reaction towards production of the most valuable aviation or automotive fuels. Consequently, a great deal of isobutane must be recovered and recycled for reuse if the process is to be practical.

The alklylatable material for reacting with isobutane is olefin-based, i.e. it is generally an olefinic hydrocarbon itself such as propylene, butylene or the like, but it also can be an alkyl sulfate or fluoride (as obtained for example in a so-called "two stage" process wherein an olefinic hydrocarbon is absorbed in sulfuric acid or HF as a first stage in the alkylation operation), or an alkyl halide, suitably an alkyl fluoride or chloride which can be made readily from olefinic hydrocarbons by other means.

The contacting of the excess isobutane with the alkylatable material and catalyst is done in liquid phase with a catalyst such as hydrogen fluoride; alkylation temperatures as high as about 100° F. can be tolerated, but the most desirable alkylation temperatures are generally lower than this. With a catalyst such as sulfuric acid alkylation temperatures substantially above about 75° F. are usually not used. The most desirable low temperature, e.g. ordinarily below about 75° F. and advantageously 30° to 55° F., can be maintained in the alkylation zone either by autorefrigeration of that zone or by effluent refrigeration applied to that zone.

In an effluent refrigeration system the output of the alklylation zone is separated into a hydrocarbon phase and a liquid catalyst phase, the separated hydrocarbon phase is passed into a flash zone of lower pressure where any low boilers, including some of the isobutane present, are vaporized with concomitant cooling of the remaining liquid hydrocarbons including alkylate, and at least a part of the remaining liquid hydrocarbons are used to refrigerate the reaction zone indirectly. In such operation the alkylation zone and effluent separator are maintained under sufficient pressure to keep all components in the liquid phase. Flashing in a flash zone as referred to herein denotes the practically adiabatic forming of chilled vapors and residual liquid by reduction of pressure on a liquid hydrocarbon material. In an autorefrigeration system the lower boiling hydrocarbons, including some of the isobutane present, are evaporated directly from the contents of the alkylation reaction zone to cool it.

Other alkylation conditions include use of a mol ratio of isobutane to olefin supplied to the alkylation zone (including isobutane recycle) substantially in excess of 1:1, and generally between about 4:1 and about 10:1, use of a liquid catalyst:liquid hydrocarbon volume ratio between about 0.5:1 and 5:1 and preferably about 1:1; and use of alkylation strength catalyst, e.g. sulfuric acid of at least about 88% strength, HF of at least about 85% titratable acidity, or an aluminum chloride-hydrocarbon complex liquid catalyst, e.g. one having an active aluminum chloride content (expressed as equivalent aluminum) of at least about 15 weight percent. The preferred catalyst is a liquid which is non-volatile under the alkylation reaction conditions, and particularly preferred is sulfuric acid maintained at about 88 to 92% strength by the addition of make-up 98–99.5% sulfuric acid in amount sufficient to maintain this strength while purging spent acid from the system.

An important part of the isobutane available for alkylation processing is obtained by fractional distillation of alkylation products in a deisobutanizing fractional distillation zone, the isobutane being recovered as a distillate fraction of high isobutane concentration, e.g. 85–95 liquid volume percent isobutane. The higher-boiling alkylate in such distillation zone is recovered in the liquid bottoms fraction. This liquid bottoms fraction ordinarily is redstilled in conventional manner to separate light ends and to produce the high quality alkylate fuel blending stock.

In a self-refrigerated alkylation zone the preponderant hydrocarbons present in the evaporated mixture include the highly volatile propane, if that is present in the reaction mixture, and isobutane. Very little alkylate escapes into the vapor phase in such evaporation for refrigeration purposes. The remaining hydrocarbon liquid, comprising unevaporated isobutane and higher boiling materials including the alkylate, is the mixture sent to the deisobutanizing fractional distillation zone.

In the usual deisobutanizing fractional distillation operation a heavy reflux of isobutane distillate is returned (e.g. a reflux ratio above 6:1) to the top of the distilling column to maintain high isobutane purity in the distillate, and only a small amount of the distillate is actually withdrawn for feed to the alkylation reactor and maintenance of the isobutane excess in the reacted mix relative to all the other hydrocarbons present therein.

Advantages of my process over conventional isobutane-olefin alkylation processes include these: it is adaptable to the maintenance of a higher isobutane concentration in the alkylation zone reaction mixture than has heretofore been previously practical; it utilizes the self-cooling of the alkylation zone, not only to remove propane diluent from the system, but also to avail itself of the concentrating effect of such refrigeration on the isobutane so as to assist in obtaining high isobutane distillate purity in the deisobutanizing fractional distillation zone; and it is adaptable to use with a variety of reactor types.

Broadly, my improvement in catalytic alkylation processes where isobutane in molar excess and an olefin-based alkylatable material are reacted in liquid phase in an alkylation zone in the presence of an alkylation catalyst, diluent propane, and normal butane under alkylating conditions, the alkylation zone is refrigerated by the evaporation of volatile hydrocarbons including isobutane and propane from the resulting hydrocarbon mixture, thereby forming a hydrocarbon vapor phase containing isobutane and propane and a remaining hydrocarbon liquid phase containing normal butane, isobutane, and alkylate product, and isobutane is recovered as an overhead distillate from said remaining hydrocarbon liquid phase by a deisobutanizing fractional distillation in a deisobutanizing fractional distillation zone, the improvement which comprises: condensing said volatile hydrocarbon vapor phase containing isobutane and propane, passing the resulting condensate to a depropanizing fractional distillation zone wherein propane is removed in an overhead vapor and isobutane is removed in a liquid bottoms fraction, returning at least a portion of said liquid bottoms fraction to said deisobutanizing fractional distillation zone, and there refluxing the deisobutanizing fractional distillation with the returned portion of said liquid bottoms fraction.

The drawings are flow diagrams showing various ways in which my improvement can be applied to the alkylation process. They are discussed in detail hereinafter.

The reactor used can be a conventional type, e.g. one employing internal recirculation such as the so-called "Stratco Contactor"; one employing autorefrigeration such as the so-called "Cascade" reactor a pump and time tank type unit wherein the average time of contact of the alkylation reaction mixture and catalyst is generally between about 5 and about 45 minutes and, advantageously, is 5 to 20 minutes; one employing external recycle of alkylation emulsion; one employing injection of reactor feed for agitation. It is usually advantageous to agitate the alkylation reaction mixture mechanically, but this can be dispensed with or minimized when using some reactor types.

In the systems illustrated in the drawings the catalysts used are liquids such as sulfuric acid, aluminum chloride-hydrocarbon complex liquid, or hydrogen fluoride. If a solid catalyst such as aluminum chloride is employed, a catalyst circulating system is not needed. The alkylation zone can be adapted to such catalyst in a conventional manner not shown.

Generally, the olefin-based alkylatable material for use in my process will be an olefin, that is propylene, butylene, amylene or higher olefin, or a mixture thereof. Alternatively, a suitable alkyl sulfate or alkyl halide can be employed in the alkylation zone.

The preferred olefin-based alkylatable feeds are butylene and propylene feed, the latter being promoted with at least about 5-20 liquid volume percent butylene for general operation. With butylene the usual feed is a conventional "B-B" feed, and it will contain a small amount of propane, e.g. about one liquid volume percent. However, the usual propylene-containing olefinic feed generally will have a great deal more propane, e.g. 10-60 liquid volume percent propane, or even more.

For clarity only the major equipment is represented in the flow diagrams hereinafter described. Instruments, surge and storage tanks, and most valves are not shown, but are to be employed in conventional manner wherever necessary or desirable. It is to be understood that a particular alkylation zone reaction vessel can stand for a single or a plurality of suitable vessels connected conventionally in parallel or series arrangement in a particular location.

All flow rates indicated in this application are given in barrels of liquid per operating day regardless of whether the flow in question is in the liquid or the vapor state. All compositions herein are in liquid volume percent.

The following gives the basis of design with special reference to Figure 1 for a plant producing 3000 BPOD of automotive (motor) alkylate. An isobutane-rich distillate, 28,000 BPOD consisting of 92% isobutane, 4% n-butane, 4% propane, and only a trace of $C_5+$ hydrocarbons, passes through vapor line 59 from deisobutanizer 54, a conventional tray tower, and is condensed in condenser 60. The entire distillate is withdrawn from the condenser into accumulator 62 and pumped from there by pump 63 through line 64 into heat exchanger 33. A fraction of the distillate can be refluxed back to the deisobutanizer tower top through reflux return 58, if desired, but this is not practiced in the instance described. The isobutane-rich distillate is cooled in exchanger 33, as hereinafter described, and fed through line 10 into alkylation contactor 13, which is the alkylation zones.

An olefin feed consisting of 570 BPOD of propylene, 500 BPOD propane, 1180 BPOD $C_4$ olefins, 500 BPOD isobutane and 150 BPOD normal butane is fed through line 12 into contactor 13 also. Temperature in the contactor is maintained at 45° F. and the pressure at 50 p.s.i.g. whereby the reaction zone contents are maintained in liquid phase.

The reactor output is withdrawn through line 14, pump 15, and line 16 into acid settler 17. Herein sulfuric acid catalyst is separated and recycled through line 18 to the contactor. The hydrocarbon to acid liquid volume ratio in the contactor is maintained at about 1:1 and the acid at 92% strength by purging acid from line 19 and adding make-up 99% strength sulfuric acid through inlet 20. Separated liquid hydrocarbon effluent phase (the "reacted mix" which contains more than 80% isobutane) is passed through line 22 and pressure reduction valve 23 whereby the pressure is reduced to 5 p.s.i.g. with the resultant flashing of lower boiling components including some of the isobutane and propane.

The chilled liquid-vapor mixture so formed is passed directly through line 24 and cooling coil 25, then out line 26 and into vapor-liquid separator 27. Herein vapors, 12,500 BPOD, are withdrawn through line 32 for compression and condensation while the remaining hydrocarbon liquid, 29,300 BPOD containing alkylate and unvaporized isobutane, is withdrawn through line 28, pump 29, line 30, and exchanger 33 for cooling of feeds and neutralization.

More specifically, the remaining liquid passes through line 34 and is neutralized with aqueous caustic soda solution in conventional manner as indicated generally in the drawing by item 61, then washed with water in conventional manner as indicated generally in the drawing by item 41. The neutralized, washed remaining hydrocarbon liquid containing alkylate and isobutane then passes to the deisobutanizer for recovery of isobutane from the higher-boiling (i.e. "heavier") components.

The hydrocarbon vapors from vapor-liquid separator 27 pass through line 32, are compressed in compressor 35 to a pressure of 130 p.s.i.a, then are withdrawn through line 36 and condensed in condenser 37. The resulting condensate is discharged through line 71 into pump 38 then neutralized with aqueous caustic soda solution in conventional manner as indicated generally in the drawing by item 39, then washed with water in conventional manner as indicated generally in the drawing by item 43.

The neutralized, washed condensate then passes through line 42 into depropanizer 43, a fractional distillation column operated in conventional manner to separate as an overhead product 500 BPOD of preponderantly propane for use as LPG or the like, and an isobutane-rich liquid bottoms fraction substantially completely depropanized (less than about 5% propane). It should be understood that, if desired, the condensate from condenser 37 or compressed vapors from compressor 35 can be fed directly to a depropanizer.

Overhead distillate from the depropanizer passes through line 44, is condensed in condenser 45, and flows into reflux accumulator 46. Pump 47 delivers reflux to the depropanizer through line 48 and propane distillate to storage through line 49. The liquid bottoms fraction passes through line 50, pump 52, line 53, heat exchanger 56, and inlet 57 at the top of the deisobutanizer. Some or all of the depropanizer bottoms can be delivered to the deisobutanizer through inlet 51 at a lower tray location if desired, but this is not done in the instant operation. The total isobutane-rich depropanizer bottoms fraction is about 12,000 BPOD.

Isobutane make-up for the operation, a mixture of 1550 BPOD of isobutane and 1350 BPOD of n-butane, is fed to deisobutanizer 54 through line 55 and heat exchanger 56. In the deisobutanizer fractional distillation is conducted with the isobutane-rich distillate passing through line 59 and condenser 60 as hereinbefore described.

The liquid bottoms fraction from deisobutanizer 54 is withdrawn through line 65 and passes into product debutanizer 66, a fractional distillation tower operated in conventional manner. The overhead distillate, a sharp cut of preponderantly normal butane passes through line 67 and is condensed in condenser 68. The condensate flows into reflux accumulator 69; it then is pumped by pump 70 through line 72 to reflux the debutanizer and through line 73 as normal butane distillate to storage (1500 BPOD). The liquid bottoms fraction, 3000 BPOD of total alkylate, is withdrawn through cooler 74 and line 75 to storage. It is suitable for automotive fuel. If aviation fuel is desired therefrom, these bottoms can be put through a conventional rerun fractional distilling operation to separate a distillate having end boiling point of 338° F. and alkaylate bottoms of higher boiling components useful for cracking stock or the like.

Figure 2 shows an alkylation zone for use in my process which is a Cascade reactor item 82 to be used in place of contactor 13 in the embodiment described in Figure 1. Broadly, items No. 80 to 102, inclusive, of Figure 2 replace items 10 to 32, inclusive, of Figure 1.

This alkylation reactor is divided into a plurality zone by baffles 86, 87, 88, and 89. The first three enumerated baffles form reaction zones which are agitated by mixers 83, 84, and 85. In this reactor sulfuric acid catalyst settles out from the hydrocarbons between baffles 88 and 89 and is withdrawn through line 98. While the withdrawn acid can be distributed to each of the agitated zones by pump 100 through inlets 102, 103, and 104, preferably it is all sent through inlet 102 to the zone agitated by mixer 83. Catalyst is purged from the system by means of line 99, and make-up high strength sulfuric acid catalyst is added at inlet 101 to maintain acid at alkylation strength and in substantially constant volume in the alkylation zone. The olefin feed enters through header 90 and is sent to the several agitated zones through lines 92, 93, and 94. The entire isobutane feed, which is the total overhead distillate from the deisobutanizer, passes through inlet 80 to a "preflash" zone (not shown) in advance of the first agitated zone in the "Cascade" reactor.

Thus in the foregoing reactor arrangement item 97 takes the place of item 32 of Figure 1; items 98, 102, 103, and 104 replace item 18 of Figure 1; item 80 replaces item 10 of Figure 1; items, 90, 92, 93, and 94 replace item 12 of Figure 1; item 99 replaces item 19 of Figure 1; item 101 replaces item 20 of Figure 1; items 95, 96, and 97 supplant item 32 of Figure 1; and item 102 replaces item 30 of Figure 1.

Figure 3 shows an embodiment of my process wherein hydrogen fluoride is the catalyst used. Isobutane-rich distillate from deisobutanizer 152, a conventional tray type tower, passes through line 155 and is condensed in condenser 156. The condensate flows into reflux accumulator 157 and is pumped by pump 158 through line 160, heat exchanger 132, and inlet 110 to alkylation contactor 112. A portion of the distillate can be refluxed to the top of the deisobutanizer through line 159, if desired.

Olefin feed for the reaction enters contactor 112 through line 113. Back pressure on the contactor is sufficient to maintain the reactants, products, and catalyst in the liquid phase therein. The reactor output is withdrawn through line 114, pump 115, line 116, and into acid settler 117. Herein liquid HF settles out and is recycled to the contactor through line 118. HF is purged through outlet 119 to conventional recovery means not shown. Substantially constant HF volume and 92% titratable acidity (by weight in the catalyst fraction) is maintained by admission of make-up HF through line 111 and by admission of recovered HF through line 120. The catalyst to hydrocarbon liquid volume ratio in contactor 112 is about 0.6:1, and the temperature is 45° F.

The separated hydrocarbon effluent is withdrawn through line 122 and passed through pressure reducing valve 123 wherein pressure is reduced to about 5 p.s.i.g. The resulting liquid-vapor mixture passes through line 124, cooling coils 125, and line 126 into separator 127. Herein a vapor-liquid separation occurs. Liquid hydrocarbon is withdrawn through line 128, pump 129, and line 130 into heat exchanger 132. It is then passed through line 133 into deisobutanizer 152 as shown.

Hydrocarbon vapors comprising part of the isobutane and virtually all of the products in the reacted mix pass through line 134 and are totally condensed in condenser 135, which is refrigerated by ammonia operating on a conventional closed cycle system not shown. The resulting condensate is discharged through line 136 and pump 137 into depropanizer 138. The depropanizer is a fractional distillation column operated in conventional manner to produce isobutane-rich depropanizer bottoms and an overhead distillate containing propane and recoverable HF, which distillate passes through line 139 and is condensed in condenser 140. The resulting condensate flows into accumulator 142; it then is pumped by pump 143 through line 144 to reflux tower 138 and through line 145 for withdrawal from the system. This withdrawn distillate is then subjected to stripping and recovery of HF and production of a propane fraction by conventional means not shown.

The isobutane-rich depropanizer bottoms are withdrawn through line 146, pump 147, line 148, heat exchanger 149, and line 150 to reflux the top of the deisobutanizer. This feed can also be admitted to the tower at lower trays by means not shown. Make-up isobutane for the process enters the system through line 153, exchanger 149, and inlet 154.

In the deisobutanizer the hydrocarbons are fractionally distilled to separate an isobutane-rich overhead distillate, handled as hereinbefore described, and, sharply cut therefrom, a liquid bottoms fraction containing hydrocarbons having a boiling point above that of isobutane.

This liquid bottoms fraction is withdrawn through line 162 and sent to product debutanizer 163, a fractional distillation column operated in conventional manner to separate normal butane as an overhead distillate and higher boiling products including alkylate as a liquid bottoms fraction. The normal butane distillate passes through line 164 and is condensed in condenser 165. The resulting condensate flows into accumulator 166; it then is pumped by pump 167 through line 168 to reflux the debutanizer and through line 169 as normal butane product. The liquid bottoms fraction is withdrawn through line 170, cooler 171, and line 172 for treatment in conventional manner by means not shown for use in automotive gasoline blending.

I claim:

1. In a catalytic alkylation process wherein isobutane in molar excess and an olefin-based alkylatable material are reacted in an alkylation zone in the presence of an alkylation catalyst, diluent propane, and normal butane under alkylating conditions, the alkylation zone is refrigerated by the evaporation of volatile hydrocarbons including isobutane and propane from the resulting hydrocarbon mixture, thereby forming a hydrocarbon vapor phase containing isobutane and propane and a remaining hydrocarbon liquid phase containing normal butane, isobutane, and alkylate product, and isobutane is recovered as an overhead distillate from said remaining hydrocarbon liquid phase by a deisobutanizing fractional distillation in a deisobutanizing fractional distillation zone having a rectifying section, the improvement which comprises: condensing said volatile hydrocarbon vapor phase containing isobutane and propane, passing the resulting condensate to a depropanizing fractional distillation zone wherein propane is removed in an overhead vapor and isobutane is removed in a liquid bottoms fraction, directly returning at least a portion of said liquid bottoms fraction to said rectifying section of said deisobutanizing fractional distillation zone, and there refluxing the deisobutanizing fractional distillation with the returned portion of said liquid bottoms fraction.

2. The process of claim 1 wherein at least the major portion of said liquid bottoms fraction is supplied as reflux to said deisobutanizing fractional distillation zone.

3. The process of claim 1 wherein the major part of the reflux to said deisobutanizing fractional distillation zone is said liquid bottoms fraction, and the preponderant isobutane feed to the alkylation zone is the overhead distillate from said deisobutanizing fractional distillation.

4. The process of claim 1 wherein the olefin-based alkylatable material is an olefinic hydrocarbon.

5. The process of claim 1 wherein the alkylation catalyst is sulfuric acid.

References Cited in the file of this patent

UNITED STATES PATENTS

| | | |
|---|---|---|
| 2,400,386 | Bolinger et al. | May 14, 1946 |
| 2,429,205 | Jenny et al. | Oct. 21, 1947 |
| 2,894,999 | Lawson | July 14, 1959 |

OTHER REFERENCES

Goldsby et al.: The Oil and Gas Journal, vol. 54, No. 20, pp. 104–7, September 19, 1955.